United States Patent [19]

Lection et al.

[11] Patent Number: 5,736,985

[45] Date of Patent: Apr. 7, 1998

[54] GUI PUSHBUTTON WITH MULTI-FUNCTION MINI-BUTTON

[75] Inventors: David Bruce Lection, Raleigh; Mark Edward Molander, Cary, both of N.C.

[73] Assignee: International Business Machines Corp., Armonk, N.Y.

[21] Appl. No.: 674,373

[22] Filed: Jul. 2, 1996

[51] Int. Cl.[6] .................................................. G06F 3/00
[52] U.S. Cl. .................................................. 395/354
[58] Field of Search ............................ 345/326–358, 345/145–146, 902

[56] References Cited

U.S. PATENT DOCUMENTS

| | | | |
|---|---|---|---|
| 4,712,191 | 12/1987 | Penna | 395/353 |
| 5,140,677 | 8/1992 | Fleming et al. | 395/349 X |
| 5,317,687 | 5/1994 | Torres | 395/352 |
| 5,392,389 | 2/1995 | Fleming | 395/349 |
| 5,602,997 | 2/1997 | Carpenter et al. | 395/349 |

*Primary Examiner*—John E. Breene
*Attorney, Agent, or Firm*—Jeanine S. Ray-Yarletts

[57] ABSTRACT

The present invention enhances the usability of a pushbutton in a graphical user interface (GUI) by allowing for multi-function pushbuttons where the secondary function can be one of many alternatives. This allows a user to have a straight-forward graphical interface to actuating functions that does not clutter the screen, yet still has the ability to offer many combinations of functions.

14 Claims, 6 Drawing Sheets

323

GUI PUSHBUTTON WITH MULTI-FUNCTION MINI-BUTTON

FIELD OF THE INVENTION

This invention relates generally to a user interface for computer software. More specifically the present invention relates to a method of allowing multiple functions to be initiated by a single button represented on a terminal device using a graphical user interface (GUI).

BACKGROUND OF THE INVENTION

In recent years the use of personal computers and PDAs (Personal Data Assistants) have increased dramatically. Only a few years ago, the average computer user had a college degree in computer science or data processing, today personal computers are commonplace. The target or average user is now one who has little or no prior experience with computers or computer software. This is demonstrated by the use of computers in the grade schools, grocery stores and countless other aspects of everyday life.

Coincident with the increased use of personal computers and as a result of years of software development, more and more function has been introduced into smaller, faster and less expensive devices. Only a few years ago, the only interface that a user had to the computer was a command line interface. To use the computer, the user was required to know the commands and to enter them onto a blank screen to get the results he desired. If the user was not familiar with the commands that were available, the user was forced to look in a book for the information. This was a tedious and time consuming process which prohibited the use of the computer by anyone who was not specially trained. As computer technology became less expensive, the market demanded a more friendly user interface, one that required less training or experience to effectively operate.

Generalized standards have arisen which define certain aspects of the computer screen interface. Graphical User Interface (GUI) standards have been documented so that applications claiming to be GUI applications have a similar look and feel. This allows a user to be able to predict events that will occur when undertaking certain actions, regardless of the application being worked on. It reduces the requirement for training for individual applications, platforms or operating systems and shortens the time in which new applications can be mastered.

An example of GUI standards is the *IBM CUA Guidelines and Architecture*, Publication number SC26-4399-00 available from International Business Machines Corporation which cover standards for screen layout, scroll bars, menus and many other user interfaces. Other examples include *The Windows® Interface Guidelines for Software Design* by Microsoft Corporation and *Human Interface Guidelines: The Apple Desktop Interface*, ISBN 0-201-17753-6.

GUIs also allow the definition of on-screen pushbuttons as a metaphor for invoking certain functions. Pushbuttons were introduced to allow the user to click in a predefined area of the screen which is visually distinct to invoke a function. When the user clicks mouse button one (usually the left mouse button) on the pushbutton, also known as the mouse selection button in GUI terms, a predefined function will execute. This conserves screen space in that the pushbutton does not require a large dialog area and utilizes one or a few key words to denote the function. Each pushbutton occupies a small area, thereby allowing multiple functions to be placed on a single screen without the screen appearing cluttered.

A limitation on this implementation of a pushbutton is that it caused only a single function to be executed. The addition of more and more pushbuttons to a screen to provide more and more function is not a viable solution since, as more buttons are added to the screen, the interface becomes crowded, confusing and less usable. A method is required to allow additional functions to be selected without adding more pushbuttons to the screen.

In an effort to solve the problem of only allowing one function to be performed by the pushbutton, a multi-function pushbutton was created. This multi-function pushbutton was created for International Business Machine's Pen for OS/2® software product. The pushbutton as shown in FIG. 1 consists of a rectangular larger button 101 which contains a text label 102 and a smaller mini-button 103. The text label denotes the primary function and the icon 104 contained in the mini-button denotes the secondary function. If the user clicks the button anywhere in the larger pushbutton's area, but not on the mini-button, the text denoted function is invoked. If the user clicks the mini-button, both functions are invoked with the text denoted function being invoked first, then the icon denoted function being invoked.

This was a significant improvement of the use of pushbuttons for the GUI interface, but problems emerged in that the original mini-button permitted the invocation of the text denoted function by itself or the invocation of the text denoted function and the mini-button function together. This was a usability concern since users had to know which part of the whole pushbutton to select. It wasn't intuitively obvious which part of the pushbutton would perform both functions and which part would only perform one function. In addition, while this was a significant improvement in the use of pushbuttons in a GUI, the original implementation was limited to a single icon denoted function and the user could not temporarily disable the icon denoted function.

OBJECTS AND SUMMARY OF THE INVENTION

In view of the above, an object of the invention is to provide a user selectable mini-button function wherein the user can determine which function will be performed upon selection of the mini-button.

It is another object of the invention to allow the user to alter processing of the button to always invoke both functions, but to allow the user to select a null function for the mini-button.

The foregoing objects are achieved by providing a method and system of providing a user interface to a plurality of related functions comprising a first display actuating button and a second displayed actuating button wherein the first actuating button allows a function related to the first actuating button to execute and the second actuating button allows the function associated with the first actuating button to execute, then sequentially, the one of a plurality of functions currently represented by the second actuating button will execute.

DETAILED DESCRIPTION OF THE PREFERRED EMBODIMENT

The present invention provides an enhanced mini-button, allowing the user to select the function that the mini-button will perform and allowing the user to invoke subtle changes in the basic operation of the original pushbutton.

In the preferred embodiment, the operating system used was IBM's OS/2®. As will be obvious to one skilled in the art, this invention is also applicable to other applications and operating systems which implement a graphical user interface and a pointing device for controlling the functions to be invoked by the user interface.

Figure 1:
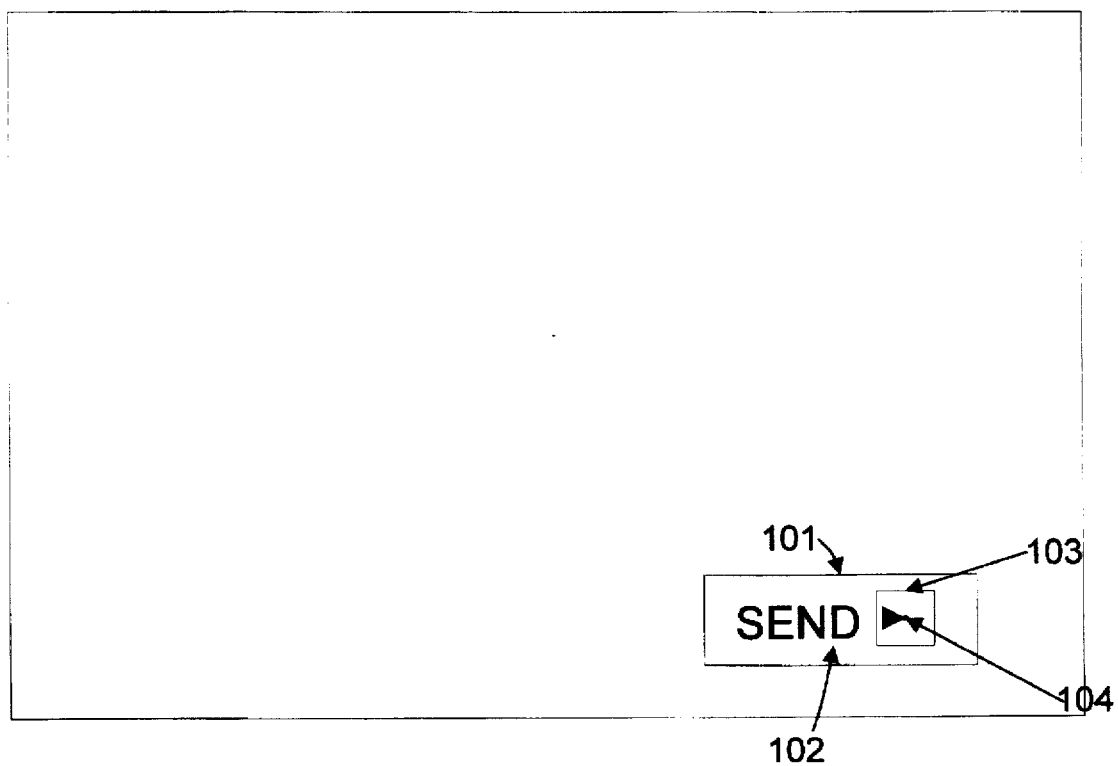
FIG. 1 shows the prior art multi-function push button.
Figure 2:
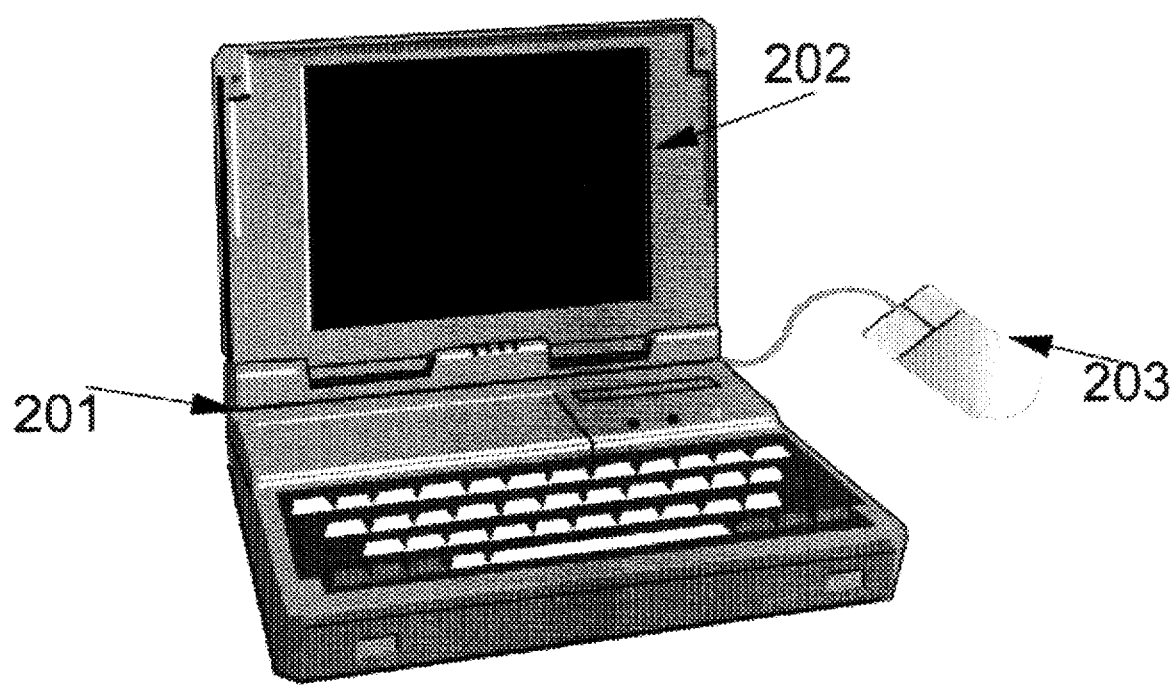
FIG. 2 shows a typical computer configuration implementing the invention.

As is shown in FIG. 2, a typical configuration in which the present invention is implemented would include a processing unit 201, a display device 202 and a pointing device 203. The processing unit could range from a general purpose computer such as an IBM PS/2® or notebook computer for example, to a specialized PDA. The display device could be integrated into the processing unit or could be a monitor separate from the processing unit. The pointing device shown in FIG. 2 is a mouse, but a pen, track ball, track point or any other pointing device could be used.

An alternative hardware implementation would be to use a 'touch sensitive' screen and use a human finger as the pointing device.

Figure 3A:
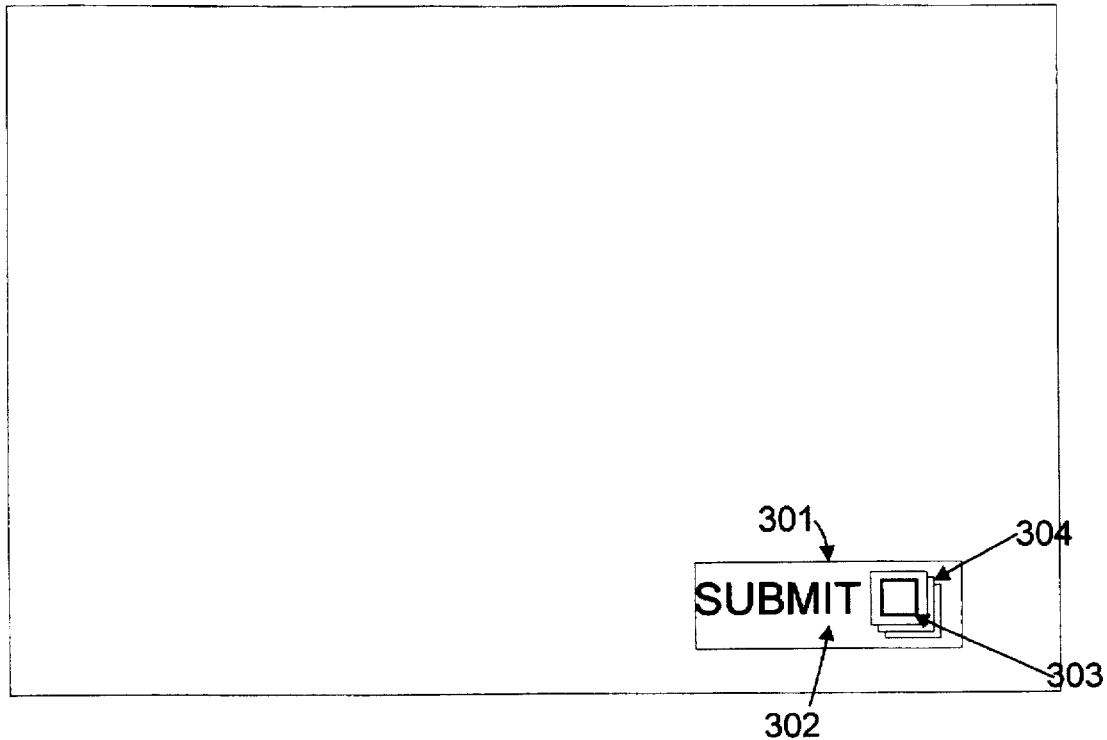
FIGS. 3A–D show examples of the multi-function pushbutton of the present invention.
Figure 3B:
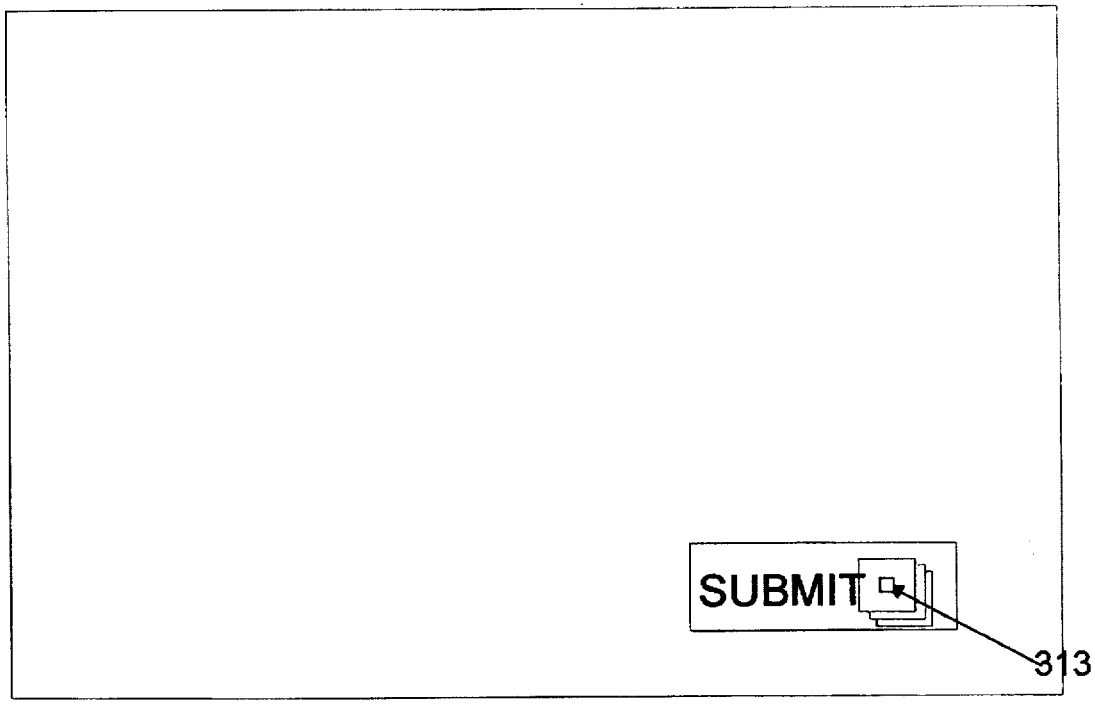
Figure 3C:
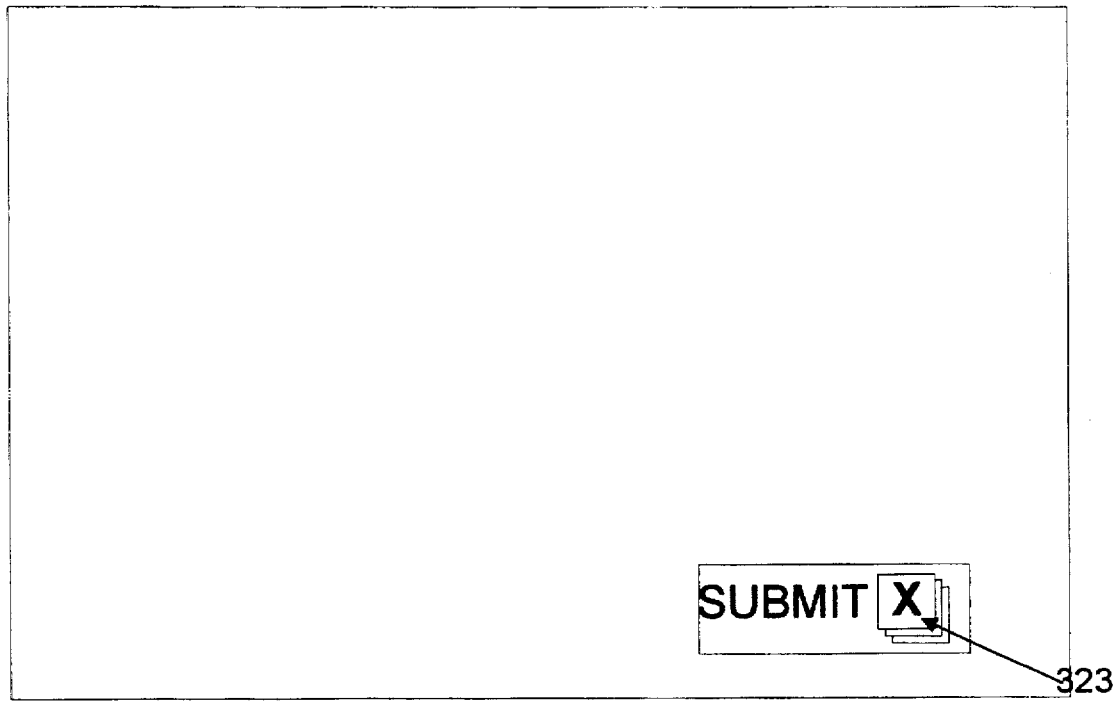
Figure 3D:
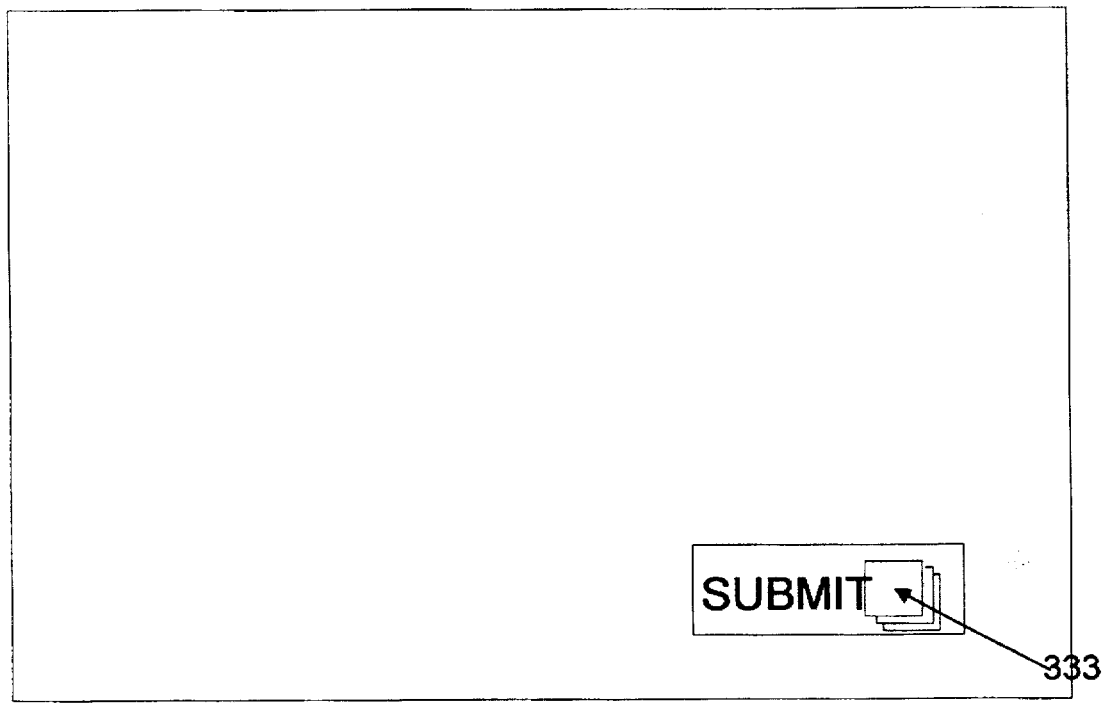

In the preferred embodiment using a personal computer and a mouse, the user can select the exact function to be invoked by the mini-button using the mouse to place the pointer over the graphical mini-button and by clicking mouse button two (usually the right mouse button for right handed operators) also known as the manipulation button in GUI terms. This will cycle through the options available for the mini-button. An example of this is depicted in FIG. 3. FIG. 3a shows a multi-function push button 301 having a primary, text denoted, function 302. The primary function in this instance is to 'submit'. The current secondary function is represented by the icon 303 and is the maximize function, therefore, if the user depresses the selection button of the pointing device while the pointer is located within the icon 303, the result is that a submit is issued, then a maximize. The boxes 304 behind the mini-button indicates that it is a multi-function mini-button. In the preferred embodiment, by depressing the right mouse button, the user can cycle through the available options for the mini-button. Additional examples of the mini-button functions are minimize 313, as shown in FIG. 3b, close 323 as shown in FIG. 3c and a null function 333 as shown in FIG. 3d.

The application implementing the pushbutton, using persistent operating storage mechanisms, will remember a chosen function until it is subsequently changed. As will be obvious to one skilled in the art, this invention is not limited to the use of a mouse. It is equally applicable to any pointing device which has the capability of identifying at least two states. This is not only applicable to two different buttons or levers on a mouse, but would also be applicable to differentiation by the method of use of the pointing device (for instance, a single click versus a double click or a single pen tap versus a double pen tap).

Figure 4:
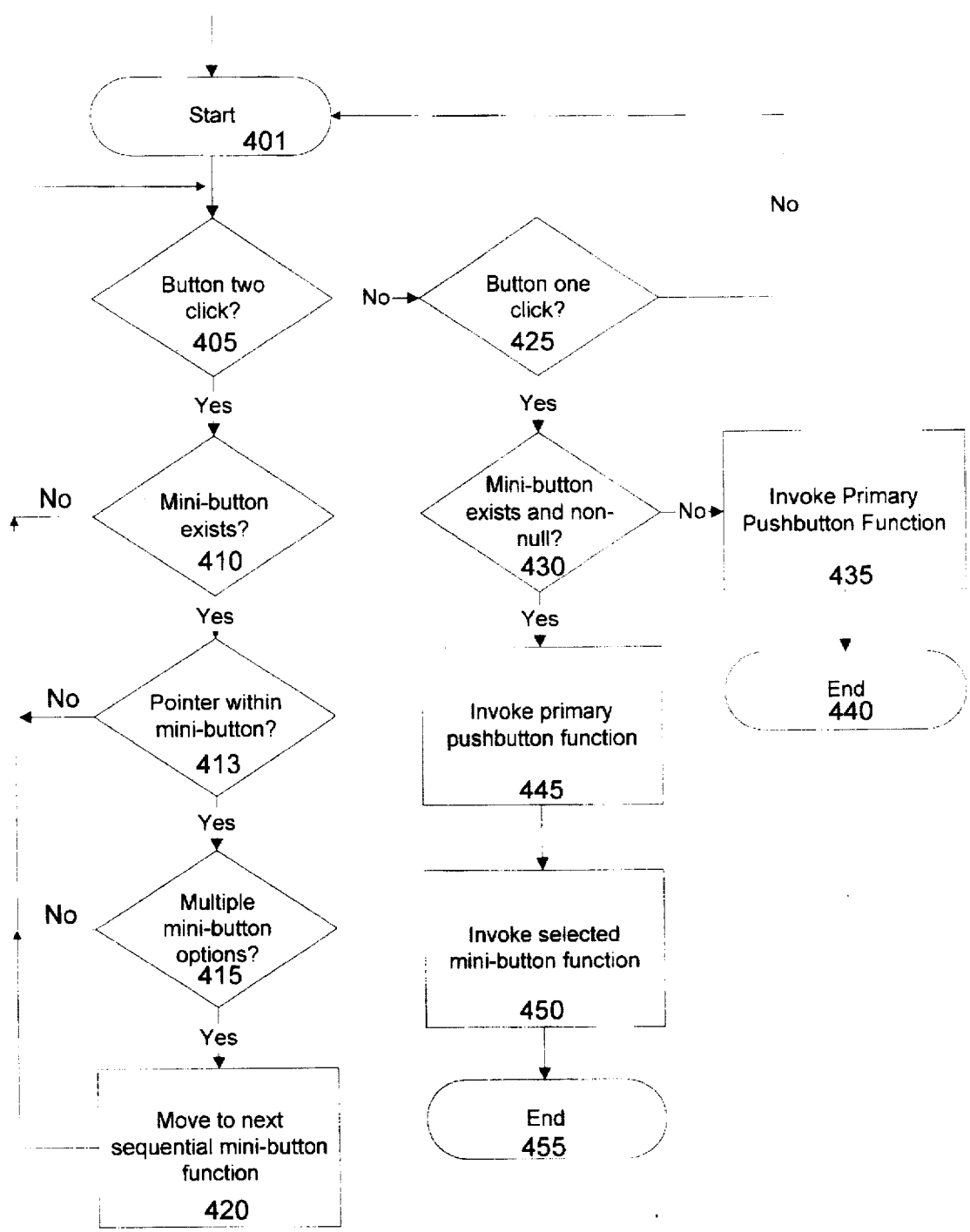
FIG. 4 shows a flow chart of the present invention.

FIG. 4 shows the logical flow of the present invention. The logical flow begins at 401. Prior to entering this flow, it has been determined that the pointer of the pointing device is located on the screen within a GUI pushbutton. A test is made at 405 to determine whether pointing device button two has been depressed while the cursor is within the area of the GUI pushbutton, more precisely, within the pushbutton. As would be apparent to one skilled in the art, this test could be modified for use with a pen, touch screen, or any other pointing device. If it is determined that button two has been depressed while the pointer is within the area of the GUI pushbutton, then a test is made to determine whether a mini-button exists 410 within the GUI pushbutton under consideration. If no mini-button exists, then control returns to step 401. If a mini-button does exist within the pushbutton under consideration, then a test is made to determine whether the pointer is currently within the mini-button 413. If the pointer is not within the mini-button, then control returns to 401. If the pointer is within the mini-button, a test is then made to determine if there are multiple mini-button functions available for that particular mini-button 415. If there are not multiple mini-button functions available, then control is returned to 401. If there are multiple mini-button functions available then the function represented by the icon is incremented to represent the next mini-button function available sequentially. Control is then returned to 401.

If, at 405, it was determined that it was not pointer button two that was depressed, then a test is made to determine whether pointer button one has been depressed while the cursor is within the area of the GUI pushbutton 425. If it has not, then control is returned to 401. If pointer button one has been depressed while the cursor is within the area of the GUI pushbutton, then a test is made to determine whether a mini-button exists within the pushbutton under consideration 430. If a mini-button does not exist, then the primary function represented by the pushbutton is invoked 435 and the flow terminates 440. If a mini-button does exist in the area represented by the pushbutton in the GUI in which the cursor is located, then the application first invokes the primary function for the pushbutton 445, then invokes the mini-button function 450, then terminates 455.

Figure 5:
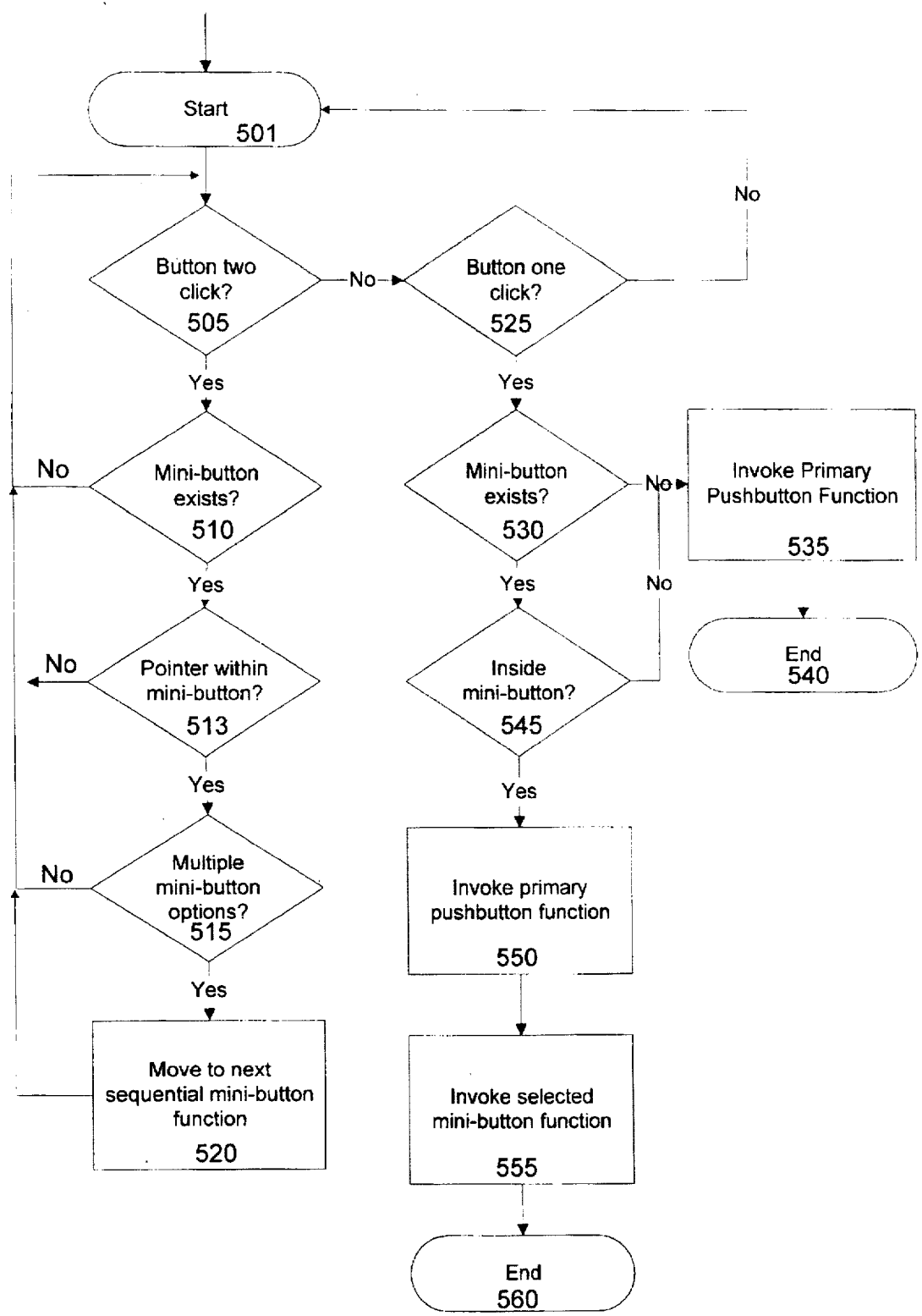
FIG. 5 is an enhancement to the flow chart of FIG. 4.

FIG. 5 shows a modification to the logical flow presented in FIG. 4. This logical flow begins at 501. Prior to entering this flow, it has been determined that the pointer of the pointing device is located on the screen within a GUI pushbutton. A test is made at 505 to determine whether pointer button two has been depressed while the poinnter is within the area of the GUI pushbutton. As would be apparent to one skilled in the art, this test could be modified for use with a pen, touch screen, or any other pointing device. If it is determined that pointer button two has been depressed while the pointer is within the area of the GUI pushbutton, then a test is made to determine whether a mini-button exists 510 within the GUI pushbutton under consideration. If no mini-button exists, then control returns to step 501. If a mini-button does exist within the pushbutton under consideration, then a test is made to determine whether the pointer is within the mini-button 513, if the pointer is not within the mini-button, then control returns to 501. If the pointer is within the mini-button, then a test is made to determine whether there are multiple mini-button functions available for that particular mini-button 515. If there are not multiple mini-button functions available, then control is returned to 501. If there are multiple mini-button functions available then the function represented by the icon is incremented to represent the next mini-button function available sequentially. Control is then returned to 501.

If, at 505, it was determined that it was not pointer button two that was depressed, then a test is made to determine whether pointer button one has been depressed while the pointer is within the area of the GUI pushbutton 525. If it has not, then control is returned to 501. If pointer button one has been depressed while the pointer is within the area of the GUI pushbutton, then a test is made to determine whether a mini-button exists within the pushbutton under consideration 530. If a mini-button does not exist, then the primary function represented by the pushbutton is invoked 535 and the flow terminates 540. If a mini-button does exist in the area represented by the pushbutton in the GUI in which the pointer is located, then a test is made to determine whether the pointer is located within the mini-button 545. If the pointer is not located within the mini-button (but is still located within the pushbutton) then the application invokes the primary function 535 and terminates 540. If the pointer is located within the mini-button of the pushbutton, then the application first invokes the primary function for the pushbutton 550, then invokes the mini-button function 555, then terminates 560.

In addition to meeting the objectives of the invention, the implementation depicted by FIG. 4 reduces the number of button taps necessary to perform the desired functions in addition to relaxing the precision and manual dextarity necessary when selecting the desired function. This saves time and effort of the user.

What is claimed is:

1. A method of providing a computer graphical user interface, utilizing a screen interface and a pointing device controlling a pointer, to a plurality of related functions comprising:

selecting a first displayed pushbutton, representing a first function, through the appropriate positioning of the pointer by way of said pointing device;

determining whether a mini-button exists within said first displayed pushbutton;

selecting one of a plurality of second functions available for said mini-button by using said pointing device;

invoking said first function and said selected second function sequentially by causing the pointing device to generate a selection signal while the pointer is positioned within either the pushbutton or the mini-button.

2. The method of claim 1 wherein one of said plurality of functions is chosen by clicking on button two of the pointing device to cycle through the plurality of functions.

3. The method of claim 1 wherein one of said plurality of functions is chosen by applying pressure to a touch screen in the area beside or ontop of the mini-button indicated by shadow boxes.

4. The method of claim 2 wherein one of said plurality of functions is chosen by double-clicking a pointing device.

5. The method of claim 1 wherein the function related to said second actuating button can be a null function.

6. A method of providing a computer graphical user interface, utilizing a screen interface and a pointing device controlling a pointer, to a plurality of related functions comprising:

selecting a first displayed pushbutton, representing a first function, through the appropriate positioning of the pointer by way of said pointing device;

determining whether a mini-button exists within said first displayed pushbutton;

selecting one of a plurality of second functions available for said mini-button by using said pointing device;

invoking said first function if the pointing device is caused to generate a selection signal while the pointer is positioned within the pushbutton but not within the mini-button; and, invoking said first function and said selected second function sequentially by causing the pointing device to generate a selection signal while the pointer is positioned within the mini-button.

7. A data processing system comprising:

a processing unit;

a display area;

a pointing device; and, a graphical user interface further comprising:

means for actuating a graphical pushbutton related to a first function;

means for actuating a graphical mini-button related to one of a plurality of second functions.

8. The data processing system of claim 7 wherein a desired second function is chosen from said plurality of second functions by a predefined "clicking" pattern using said pointing device.

9. The data processing system of claim 8 wherein said predefined "clicking" pattern is a single click with mouse button two.

10. The data processing system of claim 9 wherein said predefined "clicking" pattern is a double click with a pen or a single "click" with the pen while holding a pen button down.

11. The data processing system of claims 7 or 8 wherein one of said second functions is a null function.

12. The data processing system of claim 11 wherein either the means for actuating the graphical pushbutton or the means for actuating the graphical mini-button will cause both the first function and the second function to be invoked.

13. A computer program product including a graphical user interface comprising:

a computer-readable storage medium having computer readable program code means embodied in said medium, said computer readable program code means comprising:

computer instruction means for means for actuating a graphical pushbutton related to a first function;

computer instruction means for actuating a graphical mini-button related to one of a plurality of second functions.

14. A computer program product as claimed in claim 13, wherein a desired second function is chosen from said plurality of second function by a predefined "clicking" pattern using a pointing means.

* * * * *